No. 893,472. PATENTED JULY 14, 1908.
A. J. FORGET.
APPARATUS FOR THE RECOVERY OF PRECIOUS METALS FROM SLIMES, &c.
APPLICATION FILED JULY 21, 1905.
2 SHEETS—SHEET 1.
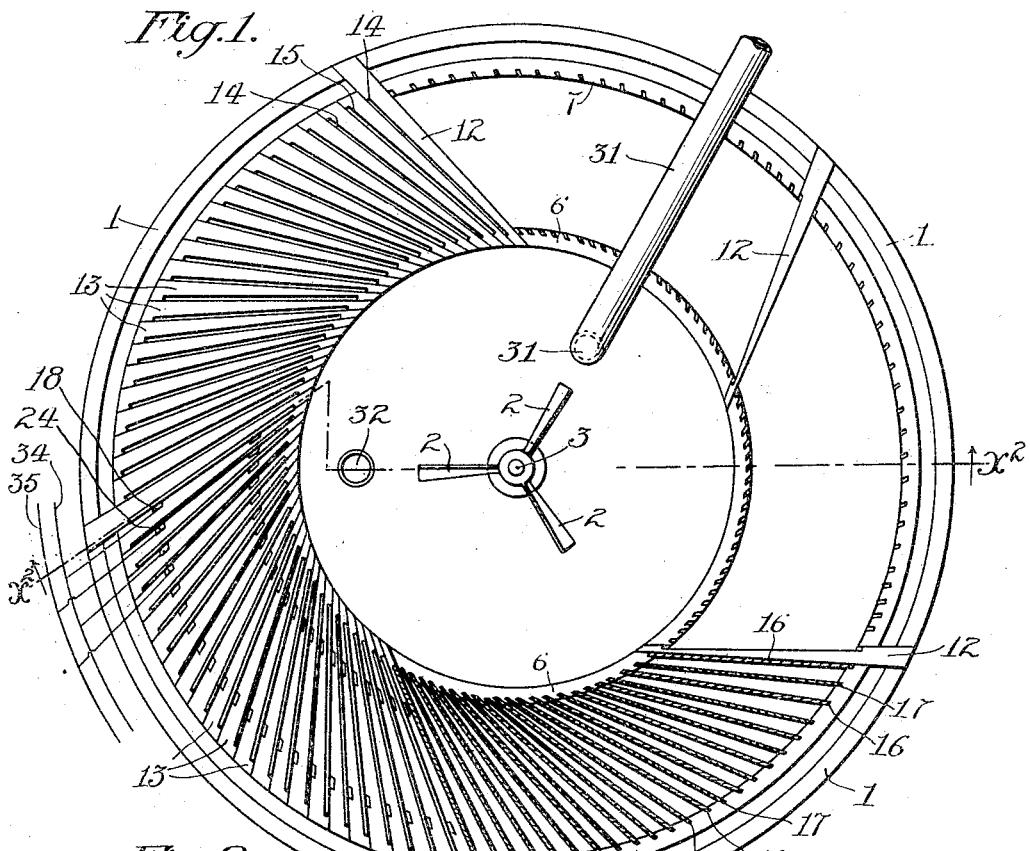
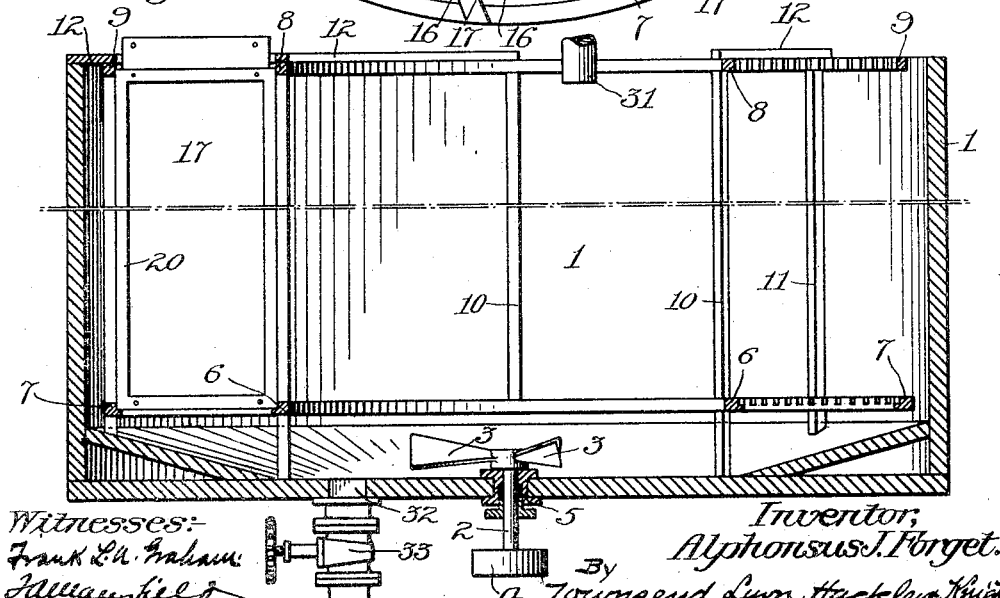
Witnesses:
Frank L. A. Graham
J. H. Mansfield
Inventor;
Alphonsus J. Forget.
By Townsend, Lyon, Hackley & Knight
his Attorneys No. 893,472. PATENTED JULY 14, 1908.
A. J. FORGET.
APPARATUS FOR THE RECOVERY OF PRECIOUS METALS FROM SLIMES, &c.
APPLICATION FILED JULY 21, 1905.
2 SHEETS—SHEET 2.
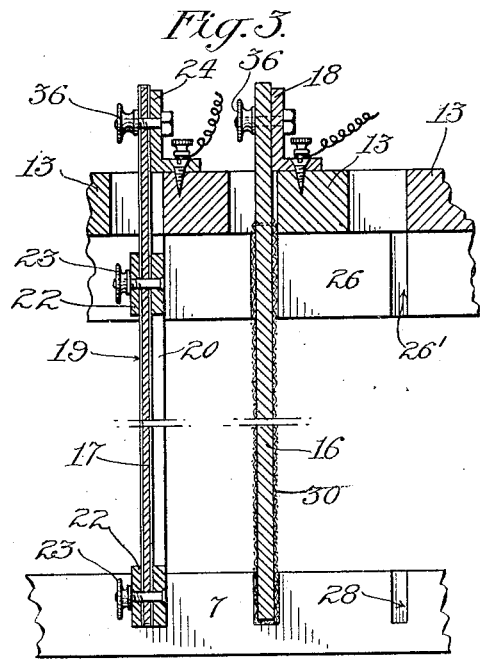
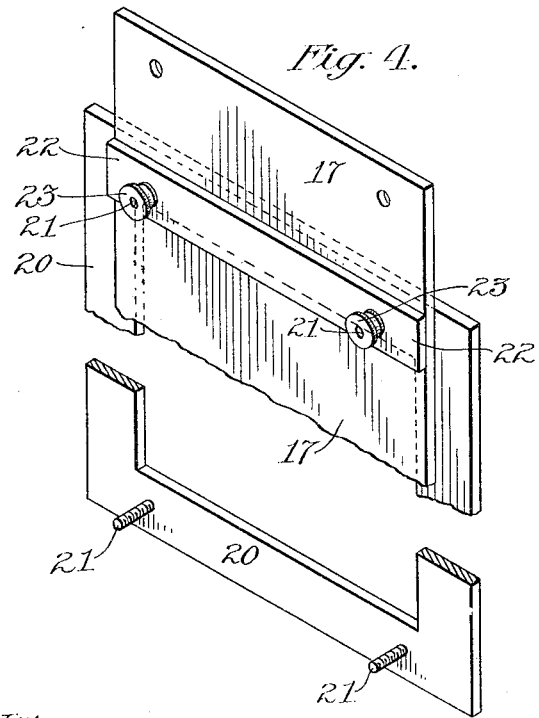
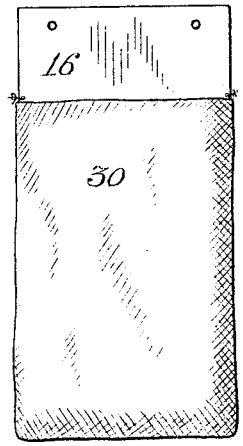
Witnesses:—
Frank L. Graham
F. H. Mansfield
Inventor;
Alphonsus J. Forget.
By Townsend, Ryon, Hackley & Knight
his attorneys

UNITED STATES PATENT OFFICE.

ALPHONSUS J. FORGET, OF LOS ANGELES, CALIFORNIA.

APPARATUS FOR THE RECOVERY OF PRECIOUS METALS FROM SLIMES, &c.

No. 893,472.  Specification of Letters Patent.  Patented July 14, 1908

Application filed July 21, 1905. Serial No. 270,628.

*To all whom it may concern:*

Be it known that I, ALPHONSUS J. FORGET, a citizen of the United States, residing at Los Angeles, in the county of Los Angeles and State of California, have invented a new and useful Apparatus for the Recovery of Precious Metals from Slimes, &c., of which the following is a specification.

This invention relates to an apparatus for the recovery of precious metals from slimes and ores by electrical deposition, without use of filters or settling and precipitation tanks, in which apparatus the slimes are exposed to the action of the electrode plates by circulation or continuous movement thereof, past and between the plates.

An important object of the invention is to provide for treatment of the slime or ore in such manner that when the process is completed there will be no material of value left in the slimes or in the solution. For this purpose the electrodes are so constituted that the precious metals will be deposited in an adherent coating on the cathode, and excess cyanid will be deposited on the anode which is so protected as to withstand the scouring action of the slimes. When the process is completed, therefore, the slimes and solution contain neither precious metal nor cyanogen in substantial quantity and may be discharged without loss.

Another object of the invention is to provide for deposition of the precious metals upon a cathode of such nature that the entire cathode can be melted down, the precious metal is being thus recovered expeditiously and economically, and a further object of the invention in this connection is to provide for deposition of the precious metals on the cathode in such manner that they will not be detached therefrom by the mechanical agitation of the solution or the movement of the slime.

The accompanying drawings illustrate an apparatus suitable for carrying out the process.

Figure 1 is a plan with parts broken away. Fig. 2 is a vertical section on line $x^2$—$x^2$, Fig. 1. Fig. 3 is a detail section of the electrodes. Figs. 4 and 5 are perspective and side views of the cathode and anode respectively.

1 designates a tank, preferably of circular form and of sufficient capacity to hold one batch of ore or slimes to be treated. Circulator means are provided for causing circulation or continuous progressive movement of the fluid, slimes or material within the tank, said means consisting of vanes 2 on the shaft 3 extending through the bottom of the tank and provided at 4 with a pulley for rotating same.

5 designates the stuffing box and bearing for the shaft 3 where it passes through the bottom of the tank.

The anodes and cathodes for the electrical deposition are arranged in circular order around the tank, preferably in such manner as to leave a space between their inner edges and the revolving circulator 2. Said circulator will cause a more or less vortical or whirling movement of the material in the tank and in order that the electrodes may cause as little opposition or friction as possible to this circulatory movement of the material, it is desirable to place the said electrodes in planes more or less tangential to the vortical movement and therefore an angle to the radial direction. The plates are supported by frame rings, two of which, 6, 7 are located near the bottom of the tank, and two, 8, 9 near the top of the tank, said rings being supported by inner posts 10 and outer posts 11 extending from the floor of the tank at different positions around the tank, said rings being connected at such different positions by top cross pieces or braces 12. Between said braces 12, strips or slats 13 are attached to the top rings 8, 9, said strips being cut away to form between successive strips, slots or openings 14, 15, to receive the respective anodes 16 and cathodes 17.

Each anode may consist of an iron plate 16 provided with clamp screws 36 for connection to bracket terminals 18 and adapted to slide into openings 14. Each cathode consists of a lead plate 17 provided with a coating of copper 19, preferably very thin, (see Fig. 3) and secured on a suitable frame 20. Said frame 20 may be a rectangular iron frame coated with paraffin paint or any other insulating paint and provided with pins 21 over which the lead cathode is pressed and secured by a clamp bar 22 and nuts 23 screwed on said pins over the bar.

24 designates the bracket terminals for the cathode.

Suitable means are provided for sustaining the electrodes against horizontal or vertical movement in the frame, the same consisting, for example, of cleats 26 provided with vertical grooves 26' in which the electrodes slide as they are put into or drawn out of place and cleats or shoulders 28 at or near the bottom rings 6, 7 to engage the bottom of the electrodes and support the same, and also by clamp screws 36, securing them to brackets 18, 24.

30 designates a bag surrounding each anode to prevent dislodgment of the deposit thereon by the scouring of the slimes.

By the above described construction, the electrodes are supported tangential to the fluid or material in its circulatory movement so that the opposition or frictional resistance to said movement is reduced to a minimum.

31 designates supply spout for charging slime or mixed ore and solution into the tank.

32 designates an outlet provided with a valve 33 for draining off the material at the end of the operation.

34, 35 designate electric circuit wires connected to the respective bracket terminals 18, 24.

The process is carried out as follows:—The ore which is preferably in a condition of slimes or of a division, or fineness corresponding to not less than 60 mesh, is placed in a tank, together with a weak cyanid solution, the strength of the solution being from 0.2 to 0.01 per cent., according to the character of the ore. The lead cathode plates are coated with an adherent metallic deposit of copper, which is preferably merely a film of inappreciable thickness being just sufficient to form a basis for the deposition of an adherent coating of the precious metals. The revolving circulator 2 is set in operation and current is supplied to the anodes and cathodes which are arranged in alternate order so that each anode lies between two cathodes, and the slime or divided ore is carried by the circulatory movement between the electrode plates continuously and repeatedly. The first effect of the cyanid solution is to dissolve a portion of the gold and silver content of the ore or slime and as the resultant solution passes the cathode plates the precious metal will be deposited therefrom in the form of an adherent metallic deposit on said plates, which will not be liable to become detached or rubbed off by the attrition of the slime or ore thereon. It would not be possible to use plain lead plates for this purpose for the reason that the deposit formed thereon would be of a spongy or loose nature and would be rubbed off and carried away by the current of slimes. The formation of the preliminary deposit of copper on the lead is therefore essential, where, as in the present case, there is a scouring action on the plate due to the movement of the slimes. In this electrolytic action wherein the precious metal is deposited at the cathode, there is a simultaneous liberation of cyanogen at the anode and part of this cyanogen will be taken up by the alkaline agent in the bath, remaining from the original dissolving action of the cyanid on the gold or silver, thus renewing the supply of alkaline cyanid in the bath and causing the solution of another portion of gold or silver, which is subsequently deposited as above described. Another portion of the cyanogen at the anode reacts on the iron anodes, forming Prussian blue, which is deposited around and on the anodes. In order to save this deposit from the scouring movement of the material in the bath, a permeable fabric or bag, indicated at 30 is preferably provided around each anode. By proportioning the quantity of cyanid used to the quantity of precious metal in the ore and slimes, it is possible to recover a large proportion of the cyanogen in the form of Prussian blue, and at the same time to cause solution and deposition of all the gold or silver content of the ore or slime. The solution remaining with the slime after the operation is therefore substantially valueless and can be allowed to run to waste with the slime so that no filtration or separation process is required in that connection.

The above described process is applicable to acid as well as basic ores and is also applicable to ores containing impurities such as arsenic and antimony, the current being regulated to such strength (for example .06 amperes per square foot, at 10 volts) that only gold and silver will be deposited and any arsenic and antimony which has been dissolved will remain in the solution. When the process is completed on a batch of material, as above described, the electrode plates are withdrawn from the tank, the material allowed to run out and a new batch of material and electrodes inserted. The cathodes can then be melted down and the gold and silver separated from the lead in well known manner, the copper deposit being sufficiently thin to be negligible in the operation.

The cyanid can be recovered from the Prussian blue in well known manner by dissolving the Prussian blue in caustic soda solution and evaporating the solution to dryness, and smelting the residue with carbonate of potash forming potassium cyanid, suitable for use in repetition of the process.

An important feature of the above described process is that the solution used is weak, but little cyanid being used. As a consequence the loss by volatilization of cyanogen and by action on base metals in the ore is reduced to a minimum. This small quantity of cyanid is used over and over again, being continually regenerated to a large extent at the anode, as it is used up in dissolving the gold or other metal. As such metal is continually being withdrawn from the ore, the cyanid would eventually be left in the solution, if it were not for the provision of an agent, namely the iron anode, that tends to continually absorb the excess cyanid by forming therewith a compound insoluble in the solution, thereby leaving the bath eventually in a condition of substantial freedom from cyanid.

What I claim is:—

1. An apparatus for separating gold or other metals from their ores, comprising a tank, a rotatable circulator located centrally in the tank for causing vortical movement of the material in the tank, and electrodes in the tank extending tangentially to the vortical movement.

2. In an apparatus for separating gold and other metals from their ores, a cathode consisting of lead coated with a thin deposit of copper of sufficient thickness to enable adherent deposition of gold or other metals thereon.

3. An apparatus for separating gold or other metals from their ores by direct treatment of the slimes or ores, comprising a tank for holding the slimes and cyanid solution, a rotatable circulator located centrally in the tank for causing circulation of the slimes and solution in the tank, and anodes and cathodes arranged tangentially in the path of the circulating material in the tank, said anodes being formed of lead coated with copper, and said cathodes being of iron, and provided with permeable protective coverings.

4. An apparatus for separating gold and other metals from their ores, comprising a tank, circulating means for causing vortical movement of the material in the tank, and electrodes in the tank extending tangential to the vortical movement.

In testimony whereof, I have hereunto set my hand at Los Angeles Cal. this 12th day of July 1905.

ALPHONSUS J. FORGET.

In presence of—
ARTHUR P. KNIGHT,
FREDERICK S. LYON.